United States Patent [19]

Ruehle

[11] 4,242,740
[45] Dec. 30, 1980

[54] SEISMIC REFRACTION EXPLORATION

[75] Inventor: William H. Ruehle, Duncanville, Tex.

[73] Assignee: Mobil Oil Corporation, New York, N.Y.

[21] Appl. No.: 868,100

[22] Filed: Jan. 9, 1978

[51] Int. Cl.³ .......................... G01V 1/13; G01V 1/38
[52] U.S. Cl. ......................................... 367/15; 367/36; 181/111
[58] Field of Search ...................... 340/7 R, 15.5 MC; 181/111; 367/15, 36, 56, 103, 105

[56] References Cited

U.S. PATENT DOCUMENTS

| 2,596,463 | 5/1952 | Barthelmes | 367/36 |
| 3,346,068 | 10/1967 | Woods et al. | 340/15.5 MC |
| 3,406,777 | 10/1968 | Benrose | 340/15.5 CP |
| 3,447,125 | 5/1969 | Peugh | 367/103 |
| 3,465,337 | 9/1969 | Tanaka et al. | 367/103 |
| 3,472,334 | 10/1969 | Snodgrass | 367/56 |
| 3,629,798 | 12/1971 | Rockwell | 367/36 |
| 4,005,382 | 1/1977 | Beaver | 367/105 |
| 4,038,630 | 7/1977 | Chelininski | 340/7 R |
| 4,064,479 | 12/1977 | Ruehle | 340/7 R |
| 4,075,635 | 2/1978 | Unz | 340/7 R |
| 4,116,229 | 9/1978 | Pering | 367/103 |

FOREIGN PATENT DOCUMENTS

| 2605711 | 8/1977 | Fed. Rep. of Germany | 340/15.5 MC |
| 2355304 | 1/1978 | France | 181/111 |

Primary Examiner—Howard A. Birmiel
Attorney, Agent, or Firm—C. A. Hugett; William J. Scherback

[57] ABSTRACT

In seismic exploration, refracted seismic energy is detected by seismic receivers to produce seismograms of subsurface formations. The seismograms are produced by directing seismic energy from an array of sources at an angle to be refracted by the subsurface formations and detected by the receivers. The directivity of the array is obtained by delaying the seismic pulses produced by each source in the source array.

9 Claims, 4 Drawing Figures

SEISMIC REFRACTION EXPLORATION

BACKGROUND OF THE INVENTION

This invention relates to seismic marine exploration and more particularly to the refraction profile method of seismic exploration.

In general, there are two types of seismic exploration methods in which seismic energy is injected into the earth at a first surface location and upon traveling through the subsurface formations is detected at a second surface location. In one such method, the reflection method, seismic energy is directly reflected by the boundaries between the subsurface formations and returns to the earth's surface. In the other of such methods, the seismic energy meets such boundaries between subsurface formations at such an angle that it is refracted along a path that passes through the lower of two formations substantially parallel to the boundary between the formations. Upon emerging from the lower formation into the upper formation, the seismic energy is again refracted at the boundary with a similar angle to that at which it originally entered the lower formation from the upper formation. Upon returning to the surface, the seismic energy is recorded as seismic refraction signals.

SUMMARY OF THE INVENTION

In accordance with the present invention, seismic energy is produced from a linear array of sources along a line of exploration and directed downwardly at such an angle that upon entering a given subsurface layering it is refracted through such layering in a direction that is parallel to such layering's boundary with the layering immediately above. Upon emerging from such layering, the refracted seismic energy travels upwardly to intersect at least one seismic receiver along the line of exploration. The directivity of the seismic energy results from a delay in firing times for each source along the linear array of sources.

In one aspect of the invention, the time delays in firing the sources are selected so as to place the directivity of the maximum lobe of the source array within the half-power response of the array. In a further aspect, the source array length is maximized so that the entering and emerging raypaths for the seismic energy fall within the half-power response of the source array.

DESCRIPTION OF THE PREFERRED EMBODIMENT

Figure 1:
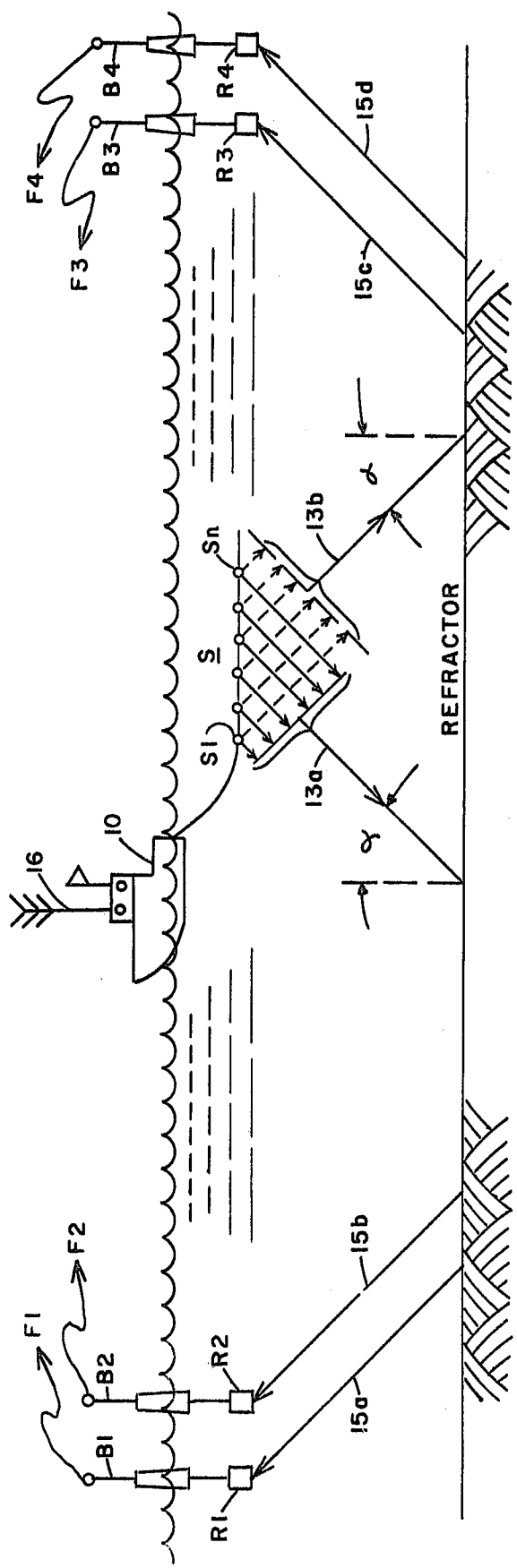
FIGS. 1 and 2 illustrate alternate marine seismic exploration systems for carrying out the invention.

Referring to FIG. 1, a seismic exploration boat 10 tows a seismic source system S including a linear array of sources S1-Sn along a line of exploration. The firing of the sources in such array is sequentially controlled so that the main lobe response of the source array is directed downwardly and forwardly of the boat 10 along the raypath 13a, striking a refractor below the surface of the earth at the critical angle $\alpha$ with the vertical. Upon being refracted, the seismic energy emerges from the refractor in a plurality of seismic energy raypaths, two of which are shown as 15a and 15b. The seismic energy in each such raypath 15a and 15b will be detected by the seismic receivers R1 and R2 suspended below the sonobuoys B1 and B2, respectively. The seismic energy received by the receivers R1 and R2 is transmitted to the boat 10 as signals F1 and F2 traveling from the transmitting antennas of the sonobuoys B1 and B2 to the receiving antenna 16 on the boat 10.

Even though most of the generated seismic energy is included within the pressure wave A, some of the energy not located within the main lobe response of the source array will be directed downwardly and rearwardly of the boat 10 along the raypath 13b. This seismic energy strikes the refractor at the critical angle $\alpha$ with the vertical so as to be refracted and detected rearwardly of the boat 10 by the seismic receivers R3 and R4 suspended below the sonobuoys B3 and B4, respectively. This seismic energy is also transmitted to the boat 10 as signals F3 and F4, respectively.

By changing the firing times of the sources in the array S, the main lobe response of the source array could alternatively be directed downwardly and rearwardly of the boat 10 along the raypath 13b so that the main portion of the refracted seismic energy would be detected and transmitted to the boat as the signals F3 and F4.

Figure 2:
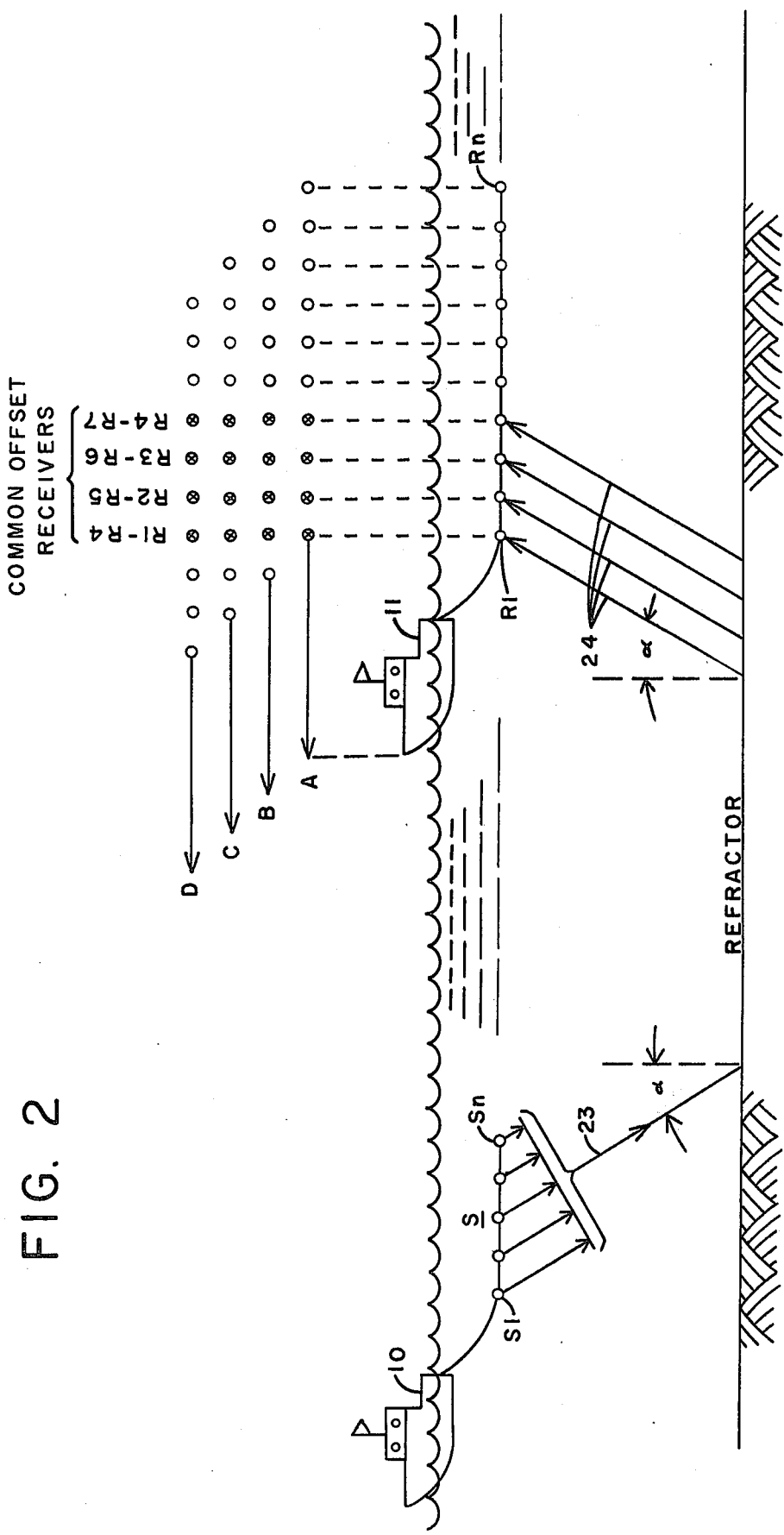

Referring now to FIG. 2, there is illustrated an alternate embodiment for the seismic exploration system of FIG. 1. A first seismic exploration boat 20 acts as a fixed location for the seismic source system S. A second seismic exploration boat 21 tows a streamer 22 including a plurality of receivers R1-Rn along a predetermined profile line. Seismic energy produced by the source S travels downward along the raypath 23, striking a refractor below the surface of the earth at the critical angle $\alpha$ with the vertical. Upon being refracted, the seismic energy emerges from the refractor in a plurality of seismic energy raypaths 24, each raypath having the critical angle $\alpha$ with the vertical. The seismic energy in each such raypath will be detected by the seismic receivers R1-Rn as the boat 21 advances the streamer 22 along the seismic profile line.

More particularly, upon the first firing of the source S, the refracted seismic energy in raypaths 24 will be detected by the receivers R1-R4, with the seismic exploration boat 21 located in position A along the profile line. As the boat 21 moves forward along the profile line to location B, the seismic source is fired a second time and the refracted seismic energy following the same raypaths 24 is detected by the receivers R2-R5. As the boat 21 moves further along the profile line to location C, the seismic source is fired a third time and the refracted seismic energy in raypaths 24 is detected by the receivers R3-R6. Similarly, with the boat 21 at location D, receivers R4-R7 will detect the refracted seismic energy arriving by way of raypaths 24. Such a seismic exploration operation using a point source is disclosed in a paper entitled "Marine Seismic Surveying Using Non-Dynamite Energy Sources," presented at the October 1975 meeting of the Society of Exploration Geophysicists in Denver, Colorado, by Mr. W. D. Jenkinson and Mr. J. R. Rogers, both of Texaco Inc.

Seismic traces recorded from each of the receivers R1-Rn for each source firing are gathered together such that those traces occupying a common surface position will be placed in one record. For example, receivers R1-R4 have a common surface position for source firings 1-4, respectively. Receivers R2-R5, R3-R6, and R4-R7 similarly have common offset positions for successive source firings. With the source S on boat 20 maintaining a fixed position and with the boat 21 advancing the receivers along the profile line one receiver position for each source firing, traces gathered in such a manner will be duplicates of one another except for ambient noise. Upon stacking of the common offset traces, such noise is suppressed, leaving an enhanced seismic recording.

In performing seismic refraction surveys utilizing embodiments of either FIG. 1 or FIG. 2, all signals arriving at the receivers R1-Rn from directions other than the emergent raypaths from the refractor can be considered as unwanted noise signals. Such noise signals will include single and multiple reflections, horizontally traveling waves, and other disturbances originating at the seismic energy source as well as other forms of noise not generated by the source. It is therefore a specific aspect of the present invention to provide for a method and system for seismic exploration in which the major portion of the generated seismic energy is directed downwardly so as to be refracted by the subsurface formations and detected by at least one seismic receiver located along the desired line of exploration.

In accordance with such invention, the seismic source S includes a linear horizontal array of sources S1-Sn as illustrated in FIGS. 1 and 2. The firing of the sources in such array is sequentially controlled so that the main lobe response of the resultant seismic pressure wave is directed toward the subsurface refractor at the critical angle $\alpha$ of its expected entering raypath as illustrated in FIGS. 1 and 2. If the seismic energy is to be radiated into the cone of the expected critical angle $\alpha$, the length of the source array and the firing delay between sources S1-Sn must be selected so that the source passband encompasses the cone limits. By establishing the limits of the critical angle $\alpha$, a maximum source array length can be determined so that the limits of the entering raypaths fall at the half-power response for the array. The maximum response lobe of the array can be rotated to include these limits.

Figure 3:
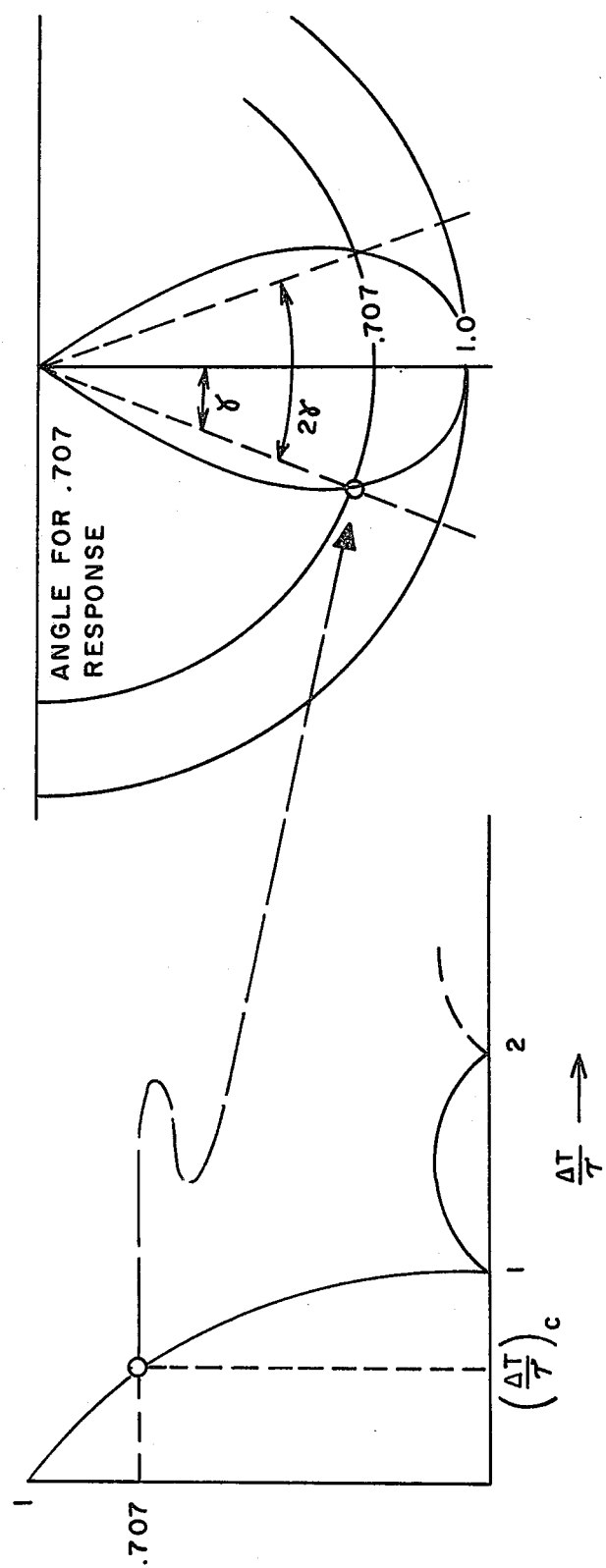
FIGS. 3 and 4 depict source array response and directivity patterns obtained by use of the seismic exploration system in FIG. 1.

The maximum array length can be determined in accordance with the array pattern response and directivity plot of FIG. 3. The array length which will include raypaths in a cone of aperture $2\gamma$ at the half-power point is given by $$L = (\frac{\Delta T}{\tau})_c (\frac{V_W}{\sin\gamma})\tau \quad (1)$$

where, $(\frac{\Delta T}{\tau})_c$ = array response coordinate defining passband of cone c (in this case, .707 amplitude), $\tau$ = signal period,
$V_W$ = water velocity, and
$\gamma$ = half angle of main lobe of directivity pattern.

The firing delay between sources S1-Sn required to rotate the main lobe sensitivity is given by $$\Delta\tau = (\frac{L}{n})(\frac{\sin\theta}{V_S}) \quad (2)$$

where,
L = array length,
$\theta$ = angle of lobe from vertical,
n = number of sources in array, and
$V_S$ = surface layer velocity.

Figure 4:
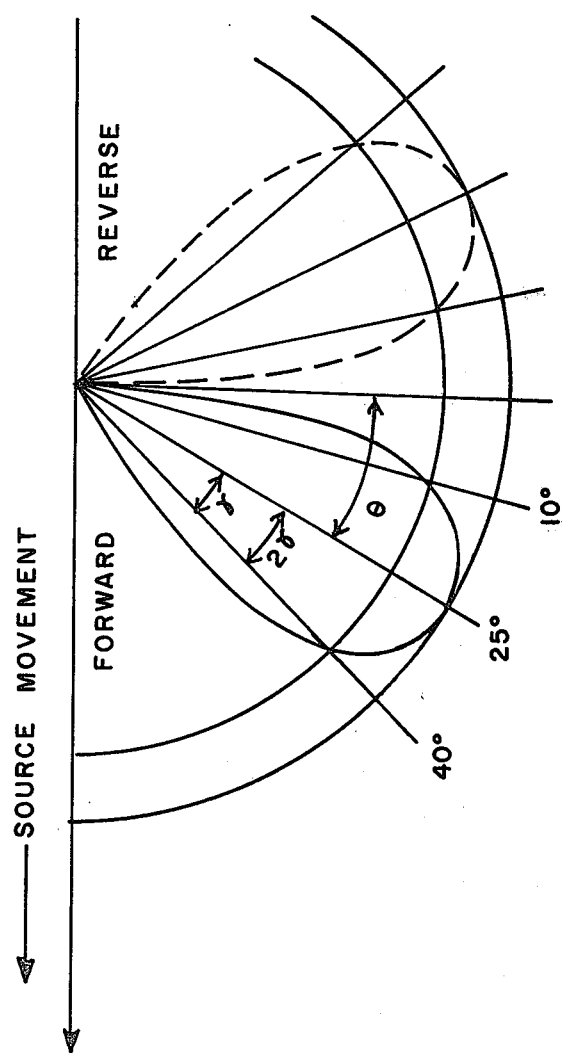

In a preferred embodiment, the expectant raypaths are 10° to 40° as illustrated in FIG. 4, thereby giving a $\gamma$ of 15°. The maximum period to be recorded is 0.05 second, thereby giving a $\tau$ of 0.05 second. The velocity of the seismic energy in water, $V_W$, is 5,000 feet per second. The value of $$(\frac{\Delta T}{\tau})_c$$

from FIG. 3 for the half-power point, or 0.707 amplitude response, is 0.5. These values yield a maximum source length per Equation (1) of 482 feet. In accordance with the preferred embodiment, 19 seismic sources are spaced along 475 feet of streamer length. Such a source length will provide a 30°-wide main lobe in the response of the source. Centering the lobe at 25° from the vertical will require source firing delays of 0.0021 second per Equation (2).

In an alternate embodiment, the sources may be unequally spaced along the array or may be unequally weighted with respect to energy capacities along the array so as to further control the resultant seismic pressure wave. The firing delay between sources S1-Sn is given by $$\Delta\tau_i = \Delta X_i \delta t \quad (3)$$

where,
$\Delta X_i$ = separation between the ith and the ith+1 source, and $$\delta t = \frac{\Delta T}{L} \text{ (i.e., stepout per unit length).}$$

By utilizing the delay of Equation (3) for nonequally spaced or nonequally weighted sources, the half-power response point for the raypaths in a cone of aperture $2\gamma$ will occur at a $$(\frac{\Delta T}{\tau})_c$$

point from FIG. 3 that is other than 0.5.

I claim:

1. A method of marine seismic refraction exploration comprising the steps of:
   (a) estimating the maximum and minimum of emergent angles for refracted acoustic energy that will travel from subsurface layers to a surface to be traversed by a line of exploration,
   (b) determining the angular difference between said minimum and said maximum emergent angles,
   (c) providing an elongated array of spaced seismic sources for movement along said line of exploration and having a length such as to produce a lobe of seismic energy whose points representing half power response subtend with respect to the vertex of said lobe an angle approximate to the value of said angular difference,
   (d) generating with said array said lobe of seismic energy,
   (e) rotating said lobe of seismic energy to a position so that points defining said half power response fall respectively on said minimum and said maximum emergent angles, (f) continuing to generate said lobe of seismic energy,
(g) detecting at the surface acoustic energy emerging from the subsurface layers, and
(h) recording said detected energy as a function of time.

2. The method of claim 1 wherein the step of rotating said lobe of seismic energy comprises delaying seismic pulses produced by each source in said array of sources by a time delay between said sources.

3. The method of claim 2 wherein said time delay is given by:

$$\Delta\tau = \frac{L}{n}\left(\frac{\sin\theta}{V_S}\right)$$

where Y is said time delay, L is the source array length, n is the number of sources in the array, $\theta$ is the angle of directivity of the main lobe from the vertical, and $V_S$ is the surface layer velocity.

4. The method of claim 1 wherein the sources are equally spaced along said array.

5. The method of claim 1 wherein the sources are unequally spaced along said array.

6. The method of claim 1 wherein the sources are equally weighted with respect to energy capacities along said array.

7. The method of claim 1 wherein the sources are unequally weighted with respect to energy capacities along said array.

8. The method of claim 1 wherein detectors are located at opposite ends of a traverse and the lobe of seismic energy is alternately generated first in the direction of one end of the traverse and then in direction of the other end of the traverse.

9. The method of claim 8 wherein the angle of rotation of the lobes generated in one direction differs from angle of rotation of the lobes generated in the other direction.

* * * * *

UNITED STATES PATENT AND TRADEMARK OFFICE
CERTIFICATE OF CORRECTION

PATENT NO. : 4,242,740
DATED : December 30, 1980
INVENTOR(S) : William H. Ruehle It is certified that error appears in the above-identified patent and that said Letters Patent are hereby corrected as shown below:

Column 5, line 16 (Claim 3) "Y" should be --T--.

Signed and Sealed this

Twenty-first Day of April 1981

[SEAL]

Attest:

RENE D. TEGTMEYER

Attesting Officer    Acting Commissioner of Patents and Trademarks